US010190893B2

(12) United States Patent
Kimura

(10) Patent No.: US 10,190,893 B2
(45) Date of Patent: *Jan. 29, 2019

(54) ENCODER

(71) Applicant: MITUTOYO CORPORATION, Kanagawa (JP)

(72) Inventor: Akihide Kimura, Saitama (JP)

(73) Assignee: MITUTOYO CORPORATION, Kanagawa (JP)

( * ) Notice: Subject to any disclaimer, the term of this patent is extended or adjusted under 35 U.S.C. 154(b) by 128 days.

This patent is subject to a terminal disclaimer.

(21) Appl. No.: 15/384,628

(22) Filed: Dec. 20, 2016

(65) Prior Publication Data

US 2017/0176219 A1 Jun. 22, 2017

(30) Foreign Application Priority Data

Dec. 22, 2015 (JP) ................................. 2015-249275

(51) Int. Cl.
*G01D 5/347* (2006.01)
(52) U.S. Cl.
CPC ................................ *G01D 5/34746* (2013.01)
(58) Field of Classification Search
CPC .. G01D 5/32; G01D 5/26; G01D 5/34; G01D 5/347; G01D 5/34707; G01D 5/34715;
(Continued)

(56) References Cited

U.S. PATENT DOCUMENTS 4,461,083 A * 7/1984 Ernst ...................... G01D 5/247
250/237 G
5,050,993 A * 9/1991 Tansey .................... G01D 5/38
250/237 G
(Continued)

FOREIGN PATENT DOCUMENTS

| JP | 05-071984 A | 3/1993 |
| JP | 2001-194187 A | 7/2001 |
| JP | 2004-529344 A | 9/2004 |

OTHER PUBLICATIONS

U.S. Appl. No. 15/384,613 to Akihide Kimura, filed Dec. 20, 2016.

*Primary Examiner* — John Lee
(74) *Attorney, Agent, or Firm* — Greenblum & Bernstein, P.L.C.

(57) ABSTRACT

A scale has a first pattern area and a second pattern areas disposed with an offset from the first pattern area in a measurement direction by 1/(2×s) of pitch. A detection head detects interference fringes caused by positive s-th-order diffracted beams and negative s-th-order diffracted beams diffracted by the scale, and output a detection result. A signal processing unit detects a reference position based on a position where light intensity is lower than a predetermined value which appears in a light intensity distribution of the interference fringes, and detects incremental positions based on the interference fringes which appear at other positions. The detection head includes a light source, a detecting unit configured to output the detection result of the beams radiated onto light receiving devices to the signal processing unit, and an optical system configured to image positive s-th-order diffracted beams and negative s-th-order diffracted beams on the detecting unit.

13 Claims, 8 Drawing Sheets

(58) Field of Classification Search
CPC ........... G01D 5/34746; G01D 5/34753; G01D 5/3473; G01D 5/34738
See application file for complete search history.

(56) References Cited

U.S. PATENT DOCUMENTS

| | | | | |
|---|---|---|---|---|
| 5,235,181 | A * | 8/1993 | Durana | G01D 5/36 250/231.14 |
| 5,424,829 | A * | 6/1995 | Sato | G01D 5/38 250/237 G |
| 5,499,098 | A * | 3/1996 | Ogawa | G01D 5/34 250/222.1 |
| 5,678,319 | A * | 10/1997 | Huber | G01D 5/38 33/707 |
| 5,856,872 | A * | 1/1999 | Horwitz | G01D 5/34715 250/231.17 |
| 5,874,729 | A * | 2/1999 | Holzapfel | G01D 5/366 250/231.16 |
| 6,005,667 | A * | 12/1999 | Takamiya | G01D 5/38 356/499 |
| 6,151,128 | A * | 11/2000 | Huber | G01D 5/38 356/499 |
| 6,452,159 | B2 * | 9/2002 | Holzapfel | G01D 5/2457 250/231.13 |
| 6,603,115 | B1 | 8/2003 | Gordon-Ingram | |
| 7,554,078 | B2 * | 6/2009 | Kawada | G01D 5/34715 250/231.13 |
| 9,310,225 | B2 | 4/2016 | Maeda | |
| 9,417,101 | B2 * | 8/2016 | Nagura | G01D 5/34746 |
| 2001/0046055 | A1 * | 11/2001 | Speckbacher | G01D 5/38 356/499 |
| 2004/0118758 | A1 | 6/2004 | Gordon-Ingram | |
| 2007/0107247 | A1 * | 5/2007 | Meissner | G01D 5/34715 33/707 |
| 2007/0187583 | A1 * | 8/2007 | Yaku | G01D 5/24476 250/231.13 |
| 2009/0040529 | A1 * | 2/2009 | Watanabe | G01D 5/2457 356/499 |
| 2009/0272886 | A1 * | 11/2009 | Kusano | G01D 5/2454 250/231.1 |
| 2009/0283667 | A1 * | 11/2009 | Morimoto | G01D 5/24409 250/231.13 |
| 2010/0270461 | A1 | 10/2010 | Tominaga | |
| 2011/0141451 | A1 * | 6/2011 | Yamaguchi | G01D 5/38 355/77 |
| 2011/0266424 | A1 | 11/2011 | Kawatoko et al. | |
| 2011/0299093 | A1 * | 12/2011 | Ishizuka | G01D 5/266 356/498 |
| 2012/0217384 | A1 * | 8/2012 | Nagura | G01D 5/34746 250/231.13 |
| 2013/0001412 | A1 * | 1/2013 | Tobiason | G01D 5/38 250/231.1 |
| 2015/0060653 | A1 * | 3/2015 | Yaku | G01D 5/34723 250/231.1 |
| 2015/0292919 | A1 * | 10/2015 | Ogasawara | G01D 5/34776 318/640 |
| 2015/0354944 | A1 * | 12/2015 | Drescher | G01D 5/266 356/494 |
| 2016/0109216 | A1 * | 4/2016 | Saendig | G01B 11/00 356/499 |
| 2016/0153812 | A1 | 6/2016 | Kato | |
| 2016/0209246 | A1 | 7/2016 | Kato | |
| 2017/0030744 | A1 * | 2/2017 | Kimura | G01D 5/266 |
| 2017/0030745 | A1 * | 2/2017 | Kimura | G01D 5/38 |
| 2017/0176218 | A1 * | 6/2017 | Kimura | G01D 5/34746 |
| 2017/0176219 | A1 * | 6/2017 | Kimura | G01D 5/34746 |

* cited by examiner

ENCODER

CROSS-REFERENCE TO RELATED APPLICATION

The present application claims priority from Japanese Patent Application No. 2015-249275 filed on Dec. 22, 2015, the entire content of which is incorporated herein by reference.

BACKGROUND

Technical Field

The present invention relates to an encoder, and particularly, to an optical encoder.

Related Art

There are now optical linear encoders as one type of devices for measuring an amount of movement. An optical linear encoder has a scale, and a detection head configured to move along the scale. The scale has an absolute pattern for detecting a reference position, and an incremental pattern for detecting an amount of relative movement between the scale and the detection head. The optical linear encoder determines a reference position based on a reference position signal representing a result of detection on the absolute pattern formed on the scale. Then, the optical linear encoder can detect the positional relation between the scale and the detection head, in view of an amount of movement from the reference position.

Also, there are known single-track absolute encoders which are configured by integrating an incremental pattern and an absolute pattern as a single scale track. In such a single-track absolute encoder, incremental tracks (an incremental pattern) and absolute tracks (an absolute pattern) are formed in a stripe pattern, and the absolute tracks are distributed in a pseudo-random manner (Patent Document 1). Therefore, the single-track absolute encoder detects a combination of signals corresponding to the absolute tracks, thereby detecting an absolute position.

Also, there has been proposed a method of measuring an absolute position where there is absolute data (an absolute pattern) formed in a discrete codeword form by removing some light reflecting lines, in an incremental scale (an incremental pattern) configured by light reflecting lines (Patent Document 2).

Further, there has been proposed a measuring scale for determining an absolute value of a reader relative to the scale in two directions (Patent Document 3). In this measuring scale, in order to detecting positions in the two directions, a checkered pattern is formed on the scale, and blocks of the pattern are imaged and decoded. The blocks include information bits defining absolute positions, and this pattern can also be used for measuring an increment.

Patent Document 1: Japanese Patent Application Laid-Open No. 5-71984
Patent Document 2: Japanese Patent Application Laid-Open No. 2004-529344
Patent Document 3: Japanese Patent Application Laid-Open No. 2001-194187

According to the above-described single-track absolute encoder, it is possible to detect the absolute position, and in order to improve the accuracy of the encoder, it is required to decrease the pitch of a scale. However, in all single-track absolute encoders of an optical type, a magnetic type, and an electrostatic capacitance type, even if fine scale pitches are set, it is impossible to read scales due to limitations attributable to their detection principles.

SUMMARY

Exemplary embodiments of the invention provide a single-track absolute encoder capable of reducing pattern period on the scale.

An encoder according to a first aspect of the invention, comprises:

a scale having a plurality of pattern areas having a plurality of patterns arranged in a measurement direction with a predetermined pitch and including at least one pattern area disposed with an offset from a neighboring pattern area in the measurement direction by $1/(2 \times s)$ (wherein "s" is an integer of 1 or greater);

a detection head configured to be relatively movable in the measurement direction with respect to the scale, and detect interference fringes caused by positive s-th-order diffracted beams and negative s-th-order diffracted beams diffracted by the scale, and output a detection result; and a signal processing unit configured to detect a reference position based on a position where light intensity is lower than a predetermined value which appears in a light intensity distribution of the interference fringes, and detect incremental positions based on the interference fringes which appear at positions other than the position where light intensity is lower than the predetermined value, wherein, the detection head includes:
a light source configured to radiate beams onto the scale;
a detecting unit having a plurality of light receiving devices arranged in the measurement direction, and configured to output the detection result of the beams radiated onto the plurality of light receiving devices to the signal processing unit; and
an optical system disposed between the scale and the detecting unit, and configured to image positive s-th-order diffracted beams and negative s-th-order diffracted beams generated when the beams are radiated onto the scale on the detecting unit.

An encoder according to a second aspect of the invention is preferably the encoder, wherein the optical system includes:
a first mirror disposed such that its mirror surface is perpendicular to the measurement direction, and configured to reflect the positive s-th-order diffracted beams toward the detecting unit; and
a second mirror disposed such that its mirror surface is perpendicular to the measurement direction and faces the first mirror, and configured to reflect the negative s-th-order diffracted beams toward the detecting unit, and
the first mirror and the second mirror are disposed at positions for imaging the positive s-th-order diffracted beams and the negative s-th-order diffracted beams on the detecting unit.

An encoder according to a third aspect of the invention is preferably the encoder, wherein the optical system is configured as a bi-telecentric imaging optical system including two or more lenses.

An encoder according to a fourth aspect of the invention is preferably the encoder, wherein the optical system includes a diffraction grating for imaging the positive s-th-order diffracted beams and the negative s-th-order diffracted beams on the detecting unit.

An encoder according to a fifth aspect of the invention is preferably the encoder, wherein the plurality of pattern areas is disposed such that a plurality of joint lines occurs due to an offset of one or both of two neighboring pattern areas.

An encoder according to a sixth aspect of the invention is preferably the encoder, wherein the joint lines are disposed in a random manner or a pseudo-random manner.

An encoder according to a seventh aspect of the invention is preferably the encoder, wherein the joint lines are disposed based on an M-sequence code.

According to the present invention, it is possible to provide a single-track absolute encoder capable of reducing pattern period on the scale.

The above and other objects, features and merits of the present invention will be more completely understood from the following detailed description and the accompanying drawings. The accompanying drawings are only for illustration, and do not limit the present invention.

DETAILED DESCRIPTION

Figure 1:
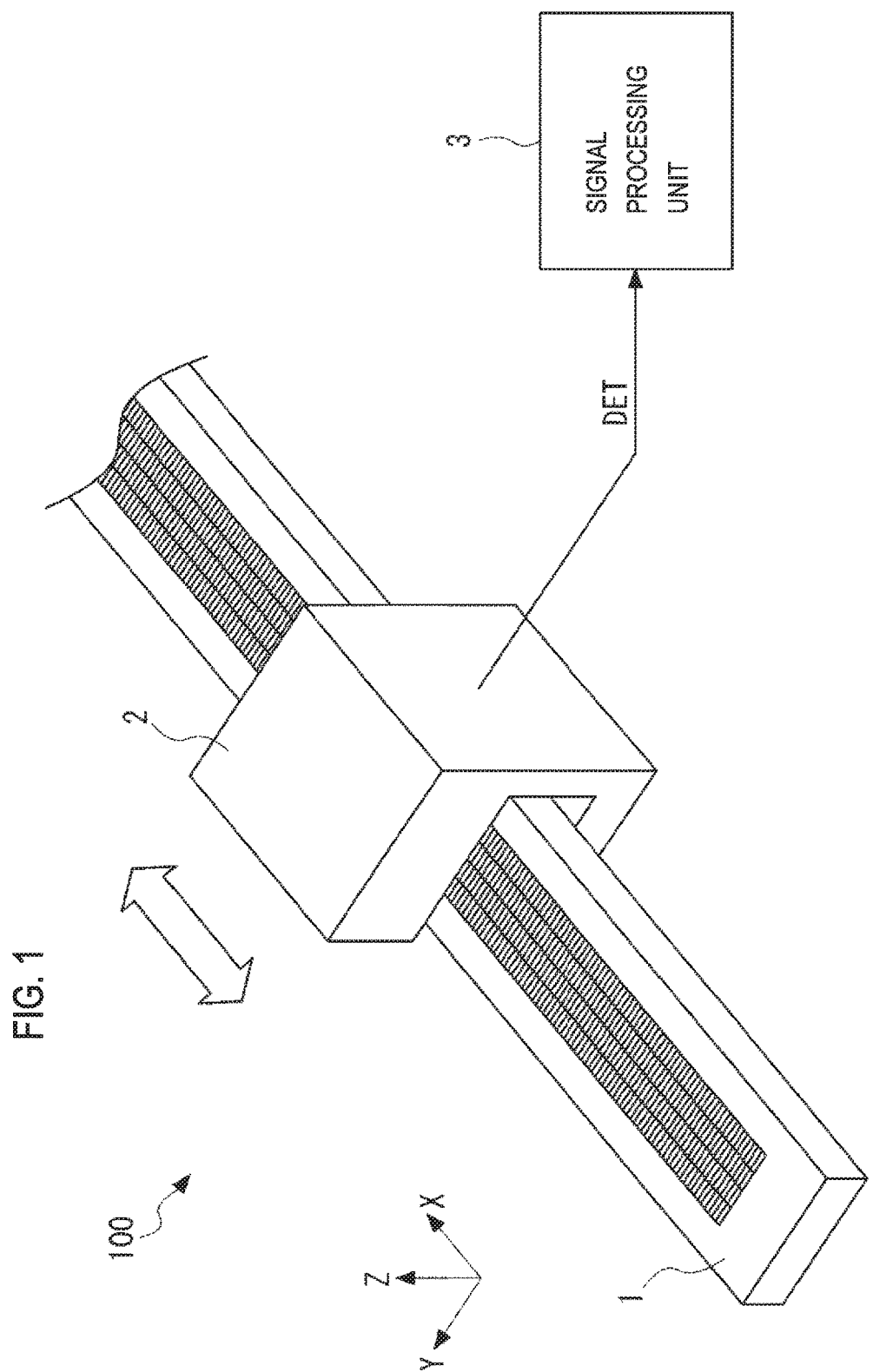
FIG. 1 is a perspective view schematically illustrating the configuration of an optical encoder according to a first embodiment.

Hereinafter, embodiments of the present invention will be described with reference to the accompanying drawings. In the drawings, identical components are denoted by the same reference symbols, and a repeated description thereof is omitted if necessary. The following encoders according to embodiments are configured as optical encoders for detecting light from a grating pattern and calculating a position.

First Embodiment

An optical encoder according to a first embodiment of the present invention will be described. FIG. 1 is a perspective view schematically illustrating the configuration of an optical encoder 100 according to the first embodiment. As shown in FIG. 1, the optical encoder 100 has a scale 1, a detection head 2, and a signal processing unit 3. The scale 1 and the detection head 2 are configured to be relatively movable along a measurement direction (an X axis direction of FIG. 1) which is the longitudinal direction of the scale 1. The scale 1 has a pattern for position detection, and if beams are radiated onto the pattern, interfering beams occur. The detection head 2 detects a change of the interfering beams in the measurement direction, and outputs an electric signal (a detection signal DET of FIG. 1) representing the detection result, to the signal processing unit 3. The signal processing unit 3 performs signal processing on the received electric signal, thereby capable of detecting the positional relation between the scale 1 and the detection head 2.

Also, hereinafter, a direction perpendicular to the measurement direction (the direction of an X axis of FIG. 1) and representing the width of the scale 1 will be referred to as a Y axis. In other words, a principal plane of the scale 1 is an X-Y plane. Also, a direction perpendicular to the principal plane of the scale 1 (the X-Y plane), that is, a direction perpendicular to the X axis and the Y axis will be referred to as a Z axis. Also, in each perspective view to be referred to below, a direction from the lower left side (a direction toward a viewer) toward the upper right side (a direction away from the viewer) on the drawing sheet will be referred to as the positive direction of the X axis. A direction from the lower right side (a direction toward the viewer) toward the upper left side (a direction away from the viewer) on the drawing sheet will be referred to as the positive direction of the Y axis. A direction from the lower side toward the upper side on the drawing sheet will be referred to as the positive direction of the Z axis.

Figure 2:
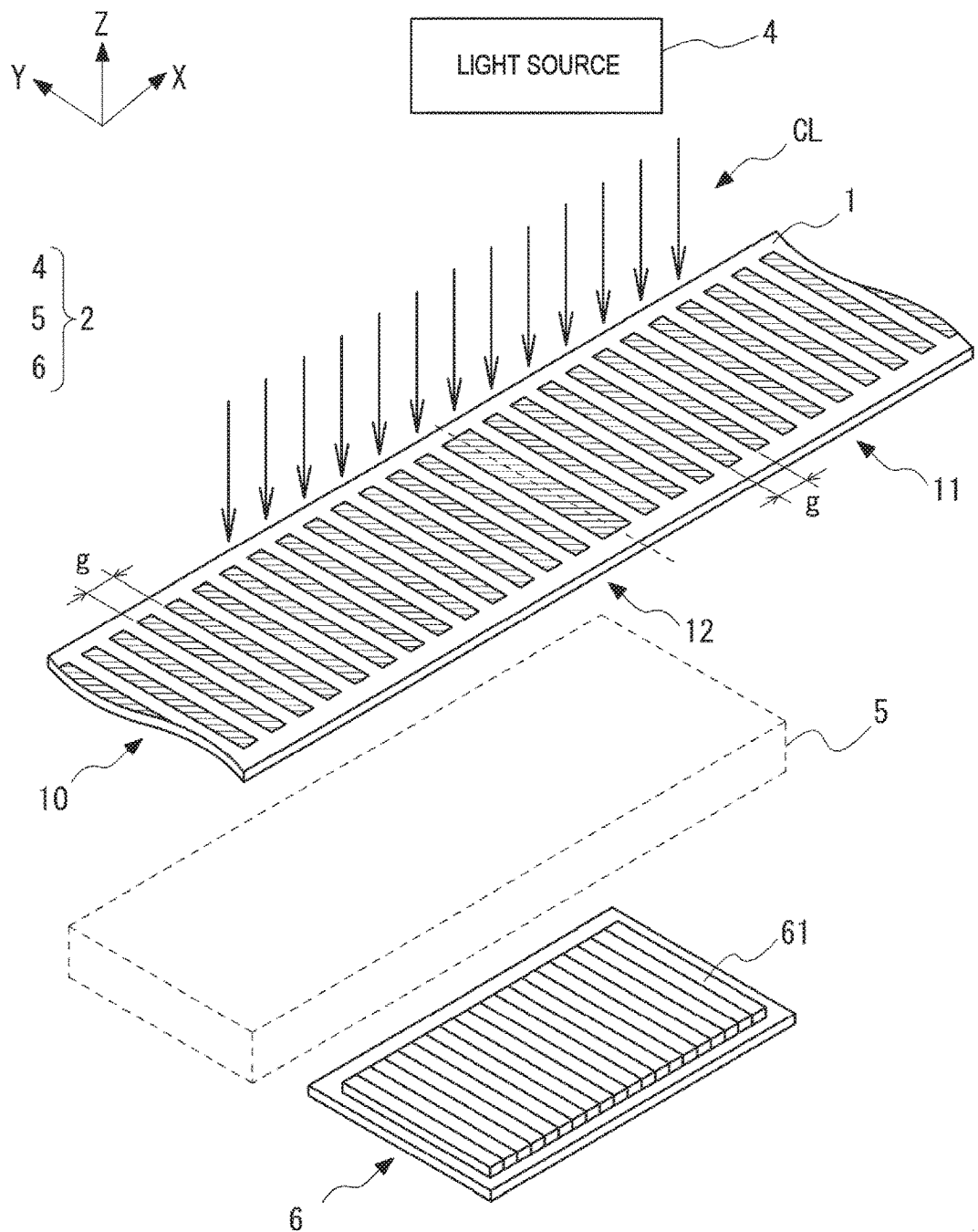
FIG. 2 is a perspective view illustrating the configuration of the optical encoder according to the first embodiment.
Figure 3:
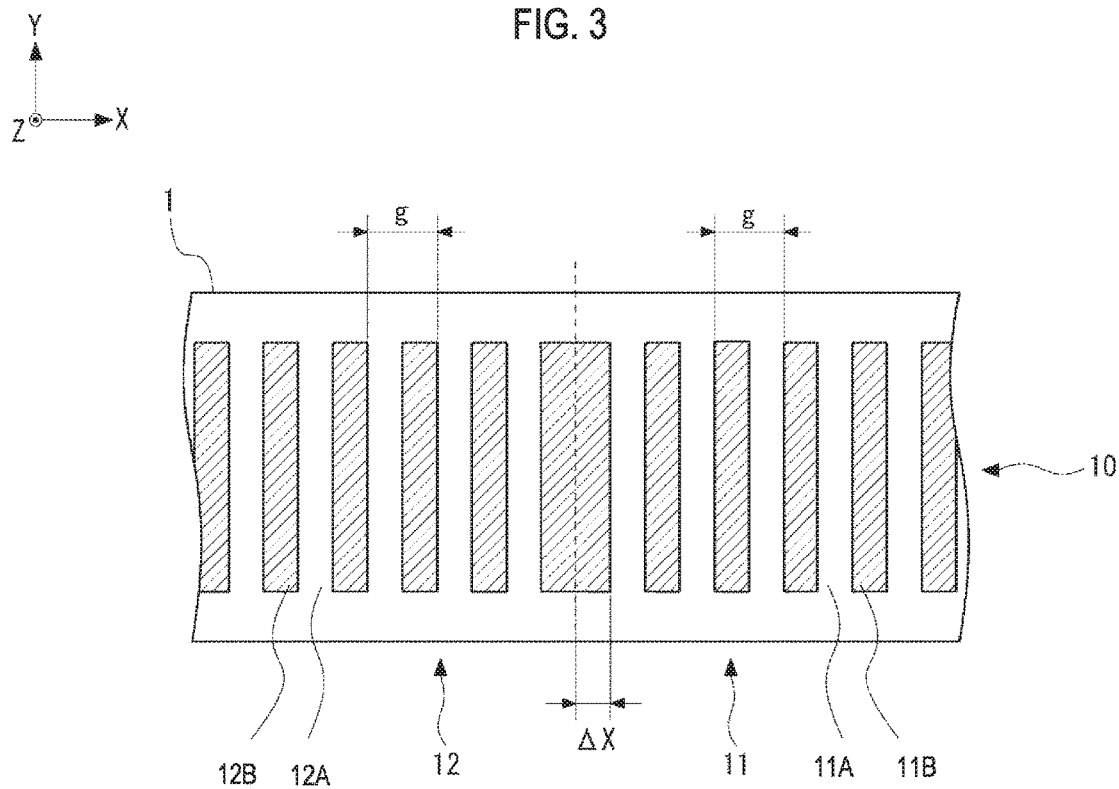
FIG. 3 is a top view schematically illustrating the configuration of a scale according to the first embodiment.

The optical encoder 100 will be described in more detail. FIG. 2 is a perspective view illustrating the configuration of the optical encoder 100 according to the first embodiment. As shown in FIG. 3, the detection head 2 has a light source 4, a detecting unit 6 and an optical system 5. As described above, the scale 1 and the detection head 2 are configured to be relatively movable in the measurement direction (the X axis direction of FIG. 2).

FIG. 3 is a top view schematically illustrating the configuration of the scale 1 according to the first embodiment. The scale 1 is a plate-like member which has a plane (the X-Y plane) perpendicular to the Z axis of FIG. 2, as its principal plane, and whose longitudinal direction is aligned in the X axis direction. The scale 1 is disposed at a position where parallel beams from the light source 4 enter in a direction perpendicular to the principal plane (the X-Y plane). In FIG. 2, the scale 1 is disposed on the negative direction of the Z axis from the light source 4.

In the plate-like member constituting the scale 1, an pattern 10 are formed. In the pattern 10, a plurality of translucent parts is disposed side by side in the X axis direction, in such a grating pattern that their longitudinal directions are aligned in the Y axis of FIGS. 2 and 3.

The pattern 10 has a first pattern area 11 and a second pattern area 12 arranged in the X axis direction. In each of the first pattern area 11 and the second pattern area 12, a plurality of translucent parts is arranged side by side in the X axis direction, in such a grating pattern that their longitudinal directions are aligned in the Y axis of FIG. 2. In other words, in the first pattern area 11, translucent parts 11A and non-translucent parts 11B are alternately repeated in the X axis direction with the pitch "g". In the second pattern area 12, translucent parts 12A and non-translucent parts 12B are alternately repeated in the X axis direction with the pitch "g".

In the present embodiment, when the order of diffracted beams to be detected by the detecting unit 6 is "s" (wherein "s" is an integer of 1 or greater), the first pattern area 11 and the second pattern area 12 are disposed in the X axis direction with an offset of [1(2×s)] of the pitch "g" (that is, $\Delta X = g/(2 \times s)$), in other words, with an offset of a phase 180/s [deg] ($\pi/s$ [rad]).

Also, the term "offset" comprehensively includes a case where the second pattern area 12 is offset with reference to the first pattern area 11 by $\Delta X$, a case where the first pattern area 11 is offset with reference to the second pattern area 12 by ΔX, and a case where both of the first pattern area 11 and the second pattern area 12 are offset with reference to the scale 1, and the sum of the offsets of them is ΔX. This is not limited to the first pattern area 11 and the second pattern area 12, and is applied even to two pattern areas neighboring each other in the measurement direction (the X axis direction) in a case where there is a plurality of (three or more) pattern areas. In other words, the plurality of (three or more) pattern areas needs only to include at least one pattern area offset in the measurement direction (the X axis direction).

It is preferable that the scale 1 be made of glass. In this case, for example, the non-translucent parts are formed by evaporating a metal layer on the glass. In this case, areas where there is no metal layer become the translucent parts. However, it is possible to use any other material to make the scale 1 as long as it is possible to make the translucent parts capable of transmitting light and the non-translucent parts incapable of transmitting light in a grating pattern.

With reference to FIG. 2, the configuration of the detection head 2 will be described. First, the light source 4 will be described. The light source 4 is a light source for outputting parallel beams CL. The light source 4 has, for example, a light source device and a collimator. The light source device outputs light, which is then collimated into parallel beams CL by the collimator. As the light source device, for example, a light emitting diode (LED), a semiconductor laser, a self-scanning light emitting device (SLED), or an organic light-emitting device (OLED) can be used. Also, as the collimator, various collimating means such as an optical lens system can be used.

The optical system 5 will be described. The optical system 5 is configured as an imaging optical system for imaging positive s-th-order diffracted beams (wherein "s" is an integer of 1 or greater) and negative s-th-order diffracted beams on the light receiving surface of the detecting unit 6. Also, the optical system 5 is configured as an imaging optical system for imaging some of positive s-th-order diffracted beams and negative s-th-order diffracted beams determined as detection objects based on the order of diffracted beams to be detected by the detecting unit 6 (to be described below), on the light receiving surface of the detecting unit 6. In the present embodiment, the optical system 5 is composed of a first mirror 51 and a second mirror 52. The first mirror 51 is provided such that its mirror surface faces the negative direction of the X axis, and reflects positive s-th-order diffracted beams having passed through the scale 1. The second mirror 52 is provided such that its mirror surface faces the positive direction of the X axis, and reflects negative s-th-order diffracted beams having passed through the scale 1. Therefore, the positive s-th-order diffracted beams and the negative s-th-order diffracted beams are imaged on the light receiving surface of the detecting unit 6.

In the present embodiment, the case in which the optical system 5 is composed of two mirrors has been described. However, this is merely illustrative. As long as it is possible to image the positive s-th-order diffracted beams and the negative s-th-order diffracted beams having passed through the scale 1 on the light receiving surface of the detecting unit 6, the optical system 5 may be configured by lenses, or may be configured by a diffraction grating, or may be configured by other optical devices, or may be configured by combining different types of optical devices.

The detecting unit 6 will be described. The detecting unit 6 is configured to be able to detect beams imaged on the light receiving surface of the detecting unit 6 through the scale 1. The detecting unit 6 performs photoelectric conversion on beams having passed through the pattern 10, thereby obtaining an electric signal, and outputs the electric signal to the signal processing unit 3. For example, the detecting unit 6 can be configured as a light-receiving-device array of a plurality of light receiving devices 61 (for example, photodiodes) arranged in the X axis direction with a pitch smaller than that of the pattern 10 (for example, half or one-fourth of the pitch of the pattern). Also, the detecting unit 6 may be configured by forming a grating with a pitch smaller than that of the pattern 10 (for example, half or one-fourth of the pitch of the pattern) on a photodiode having a large light reception area.

Figure 4:
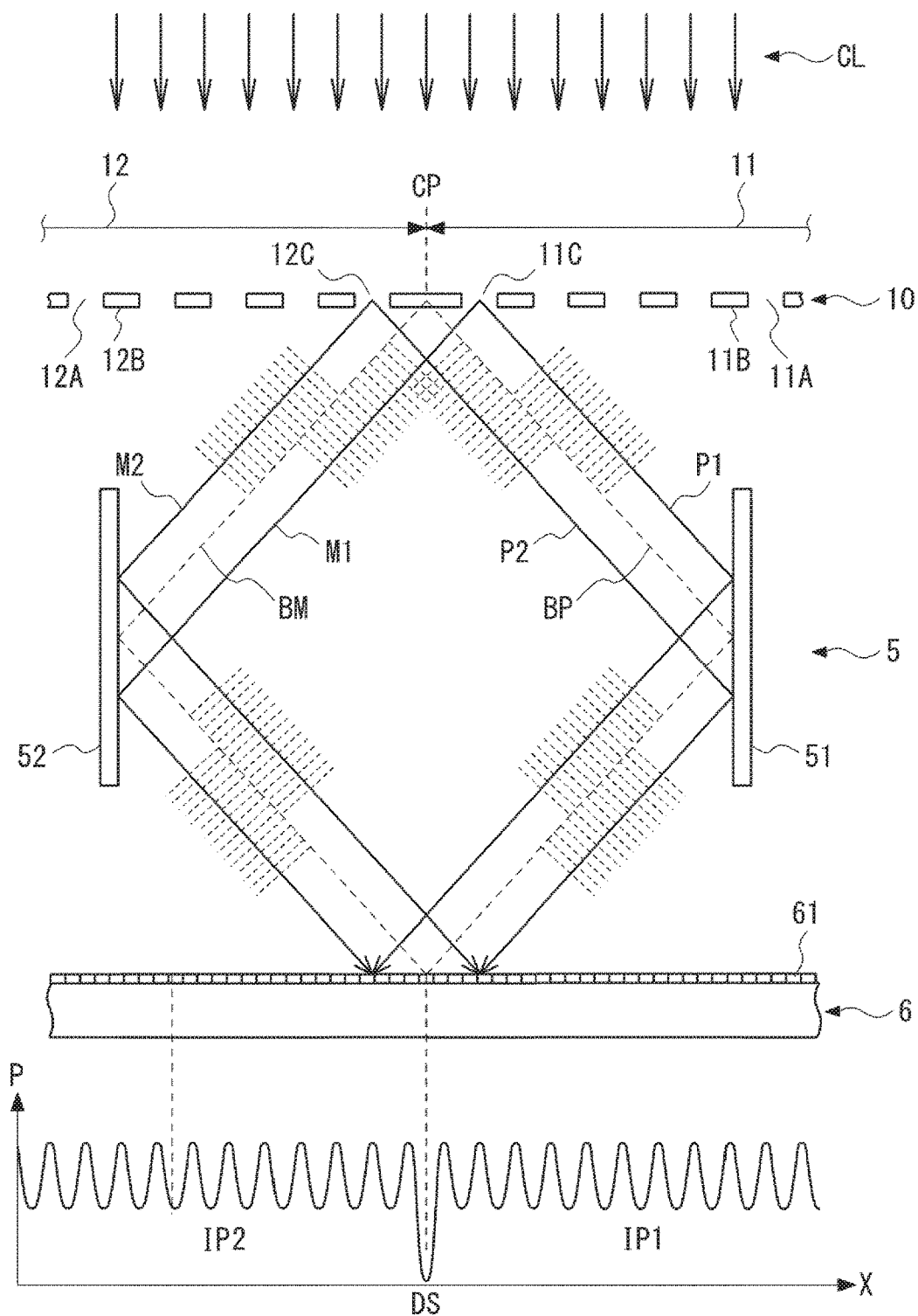
FIG. 4 is a view illustrating interference of diffracted beams and the light intensity distribution of interference fringes in the optical encoder according to the first embodiment.

Now, the property of light having passed through the pattern 10 will be described. FIG. 4 is a view illustrating interference of diffracted beams and the light intensity distribution of interference fringes in the optical encoder 100 according to the first embodiment. In FIG. 4, for simplification of the drawing, a set of positive s-th-order diffracted beams and negative s-th-order diffracted beams are shown. However, the present invention comes into effect even with respect to second-order and higher-order diffracted beams. Therefore, hereinafter, positive s-th-order diffracted beams (wherein "s" is an integer of 1 or greater) and negative s-th-order diffracted beams generally representing diffraction orders will be described. Parallel beams CL enter the pattern 10, and are diffracted by the pattern 10, whereby positive s-th-order diffracted beams and negative s-th-order diffracted beams occur.

Here, the center of the pattern 10, that is, a point on the joint line of the first pattern area 11 and the second pattern area 12 is referred to as the center point CP. A translucent part 11A of the first pattern area 11 closest to the center point CP is referred to as the translucent part 11C. A translucent part 12A of the second pattern area 12 closest to the center point CP is referred to as the translucent part 12C.

If the scale 1 reaches a reference position, a positive s-order diffracted beam P1 from the translucent part 11C of the first pattern area 11 and a positive s-order diffracted beam P2 from the translucent part 12C of the second pattern area 12 are reflected by the mirror 51, thereby being guided to the detecting unit 6. At this time, the positive s-th-order diffracted beam P1 and the positive s-th-order diffracted beam P2 reach the detecting unit 6 over the same light path length.

A negative s-th-order diffracted beam M1 from the translucent part 11C of the first pattern area 11 and a negative s-th-order diffracted beam M2 from the translucent part 12C of the second pattern area 12 are reflected by the mirror 52, thereby being guided to the detecting unit 6. At this time, the negative s-th-order diffracted beam M1 and the negative s-th-order diffracted beam M2 reach the detecting unit 6 over the same light path length.

As described above, the first pattern area 11 and the second pattern area 12 are disposed in the X axis direction with the offset of [1/(2×s)] of the pitch "g" (that is, ΔX=g/(2×s)), in other words, with an offset of a phase 180/s [deg] (π/s [rad]). In other words, in a case where the light path length of the positive s-th-order diffracted beam P1 and the light path length of the positive s-th-order diffracted beam P2 are the same, a relative phase difference attributable to the offset occurs between the positive s-th-order diffracted beam P1 and the positive s-th-order diffracted beam P2. Similarly, in a case where the light path length of the negative s-th-order diffracted beam M1 and the light path length of the negative s-th-order diffracted beam M2 are the same, a relative phase difference attributable to the offset occurs between the negative s-th-order diffracted beam M1 and the negative s-th-order diffracted beam M2. This phase difference AB can be expressed as the following Expression 1.

$$\Delta \theta = \frac{2\pi \cdot s \cdot \Delta X}{g} = \frac{2\pi \cdot s \cdot \left(\frac{g}{2s}\right)}{g} = \pi \quad \text{[Expression 1]}$$

As shown by Expression 1, between the positive s-th-order diffracted beam P1 and the positive s-th-order diffracted beam P2 reaching the light receiving surface of the detecting unit 6, the phase difference of π[rad] (180 [deg]) exists. Therefore, the positive s-th-order diffracted beam P1 and the positive s-th-order diffracted beam P2 reaching the detecting unit 6 interfere with each other in the vicinity of a boundary BP, thereby being cancelled. Also, between the negative s-th-order diffracted beam M1 and the negative s-th-order diffracted beam M2 reaching the light receiving surface of the detecting unit 6, the phase difference of π [rad] (180 [deg]) exists. Therefore, the negative s-th-order diffracted beam M1 and the negative s-th-order diffracted beam M2 reaching the detecting unit 6 interfere with each other in the vicinity of a boundary BM, thereby being cancelled. As a result, in the distribution of light intensities P which the detecting unit 6 detects, a dark part DS appears at a position corresponding to the center point CP.

For example, if a threshold for electric signals which the light receiving devices output is set, the signal processing unit 3 can easily generate a reference position pulse signal which starts at a timing when the voltage of an electric signal becomes lower than the threshold and finishes at a timing when the voltage of the electric signal becomes higher than the threshold.

Also, in the light intensity distribution, naturally, interference fringes having the pitch of g/(2×s) appear due to the translucent parts of the first pattern area 11 and the second pattern area 12 disposed with the pitch "g" on both sides of the dark part DS. Since the interference fringes have the constant pitch, it is possible to use the interference fringes as incremental signals.

Since the second pattern area 12 is offset from the first pattern area 11 in the X axis direction by g/(2×s) as described above, even in the interference fringes, an offset occurs. In this case, an offset between interference fringes IP1 caused by the first pattern area 11, and interference fringes IP2 caused by the second pattern area 12 is the same as the pitch g/(2×s) of the interference fringes. As a result, the interference fringes IP1 and the interference fringes IP2 have the same phase. In other words, it can be understood that, even if the first pattern area 11 and the second pattern area 12 are disposed with the offset, incremental signals are not influenced. Therefore, it is possible to accurately perform incremental position detection.

Also, in order to improve the contrast of the dark part DS, it is preferable to use positive first-order diffracted beams and negative first-order diffracted beams having the largest light intensity amplitude. Hereinafter, a preferred example will be described with a focus on positive first-order diffracted beams and negative first-order diffracted beams. In this case, since "s" is 1, the offset ΔX becomes g/2. Also, the phase difference between a positive first-order diffracted beam P1 and a positive first-order diffracted beam P2 and the phase difference between a negative first-order diffracted beam M1 and a negative first-order diffracted beam M2 become π [rad] (180 [deg]) as shown by Expression 1.

Therefore, as described above, in the distribution of light intensities P which the detecting unit 6 detects, the dark part DS appears at a position corresponding to the center point CP.

Also, in the light intensity distribution, naturally, interference fringes having the pitch of g/2 appear due to the translucent parts of the first pattern area 11 and the second pattern area 12 disposed with the pitch "g" on both sides of the dark part DS. Therefore, similarly, it is possible to use the interference fringes as incremental signals.

As described above, the offset occurs between the interference fringes IP1 and the interference fringes IP2; however, this offset of the interference fringes is the same as the pitch g/2 of the interference fringes. As a result, the interference fringes IP1 and the interference fringes IP2 have the same phase, and, as described above, it is possible to accurately perform incremental position detection.

From the above description, it can be understood that, according to this configuration, it is possible to implement a single-track absolute encoder. Also, since this configuration uses diffraction and interference of beams, it has an advantage that it is possible to reduce period of the diffraction grating to be used in the scale.

Second Embodiment

Figure 5:
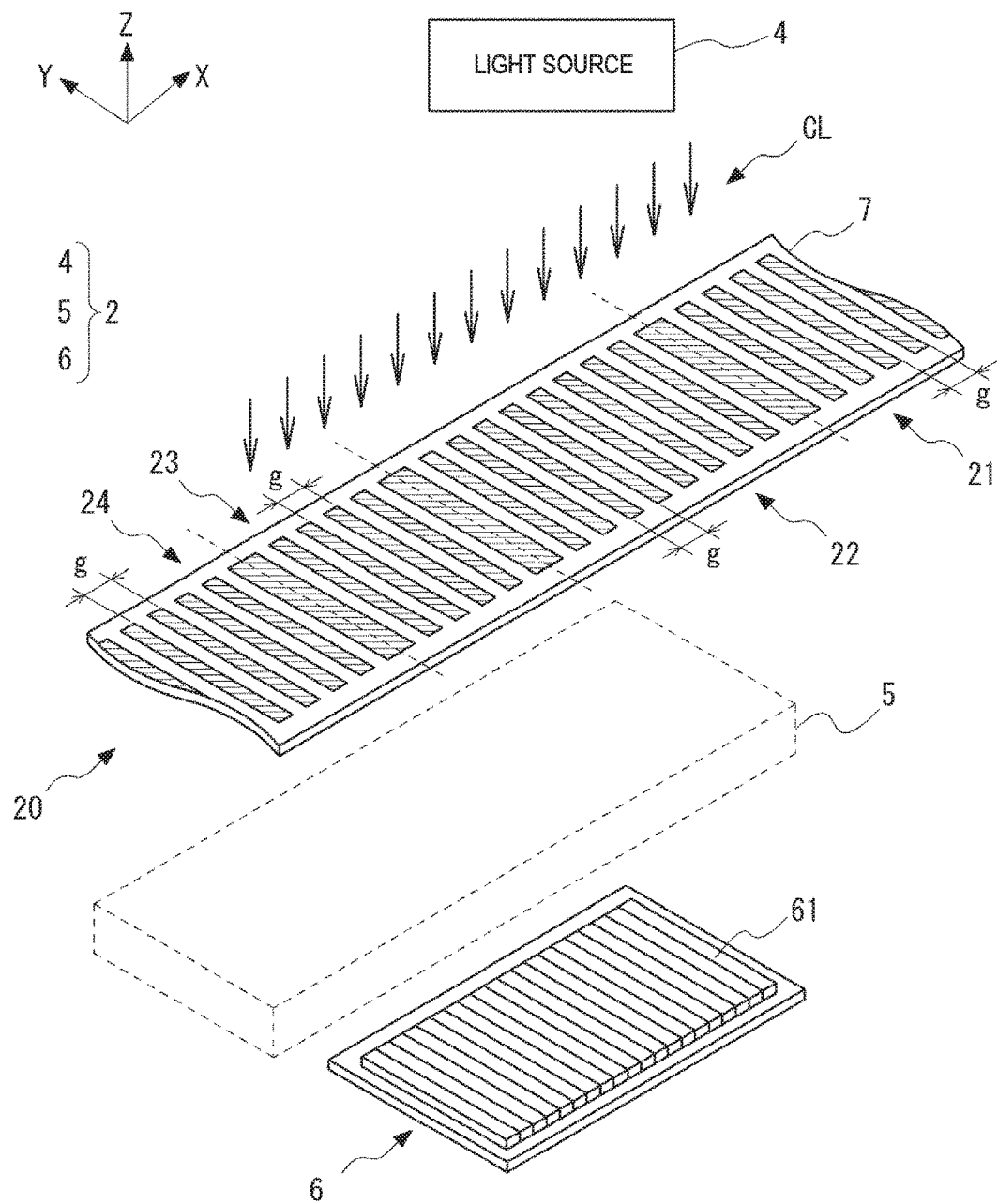
FIG. 5 is a perspective view schematically illustrating the configuration of an optical encoder according to a second embodiment.

An optical encoder according to a second embodiment of the present invention will be described. FIG. 5 is a perspective view schematically illustrating the configuration of an optical encoder according to the second embodiment. As shown in FIG. 5, the optical encoder has a configuration obtained by replacing the scale 1 of the optical encoder 100 according to the first embodiment with a scale 7, respectively.

The scale 7 has a configuration obtained by replacing the pattern 10 of the scale 1 with a pattern 20. In the pattern 10 of the scale 1, there are two areas where the patterns are disposed, and the two pattern areas are disposed with the offset in the X axis direction. However, in the pattern 20, three or more pattern areas are arranged in the X axis direction, and every two neighboring pattern areas are disposed with an offset in the X axis direction.

Figure 6:
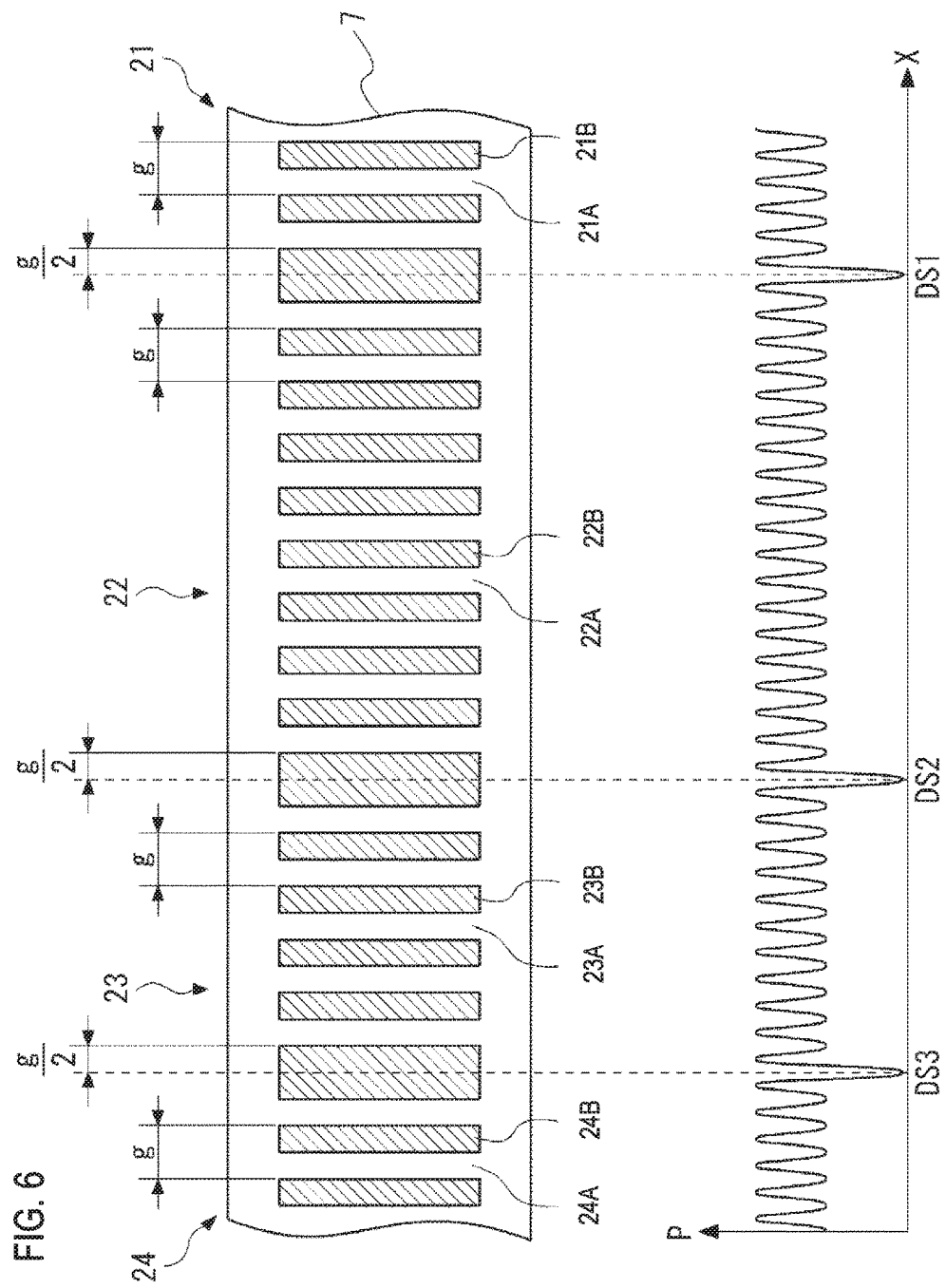
FIG. 6 is a top view schematically illustrating the configuration of a scale according to the second embodiment.

FIG. 6 is a top view schematically illustrating the configuration of the scale 7 according to the second embodiment. In FIG. 6, an example in which the pattern 20 has four pattern areas will be described. In the scale 7, first to fourth pattern areas 21 to 24 are disposed in order in a direction from the negative side of the X axis toward the positive side.

In each of the first to fourth pattern areas 21 to 24, similarly in the first pattern area 11 and the second pattern area 12 according to the first embodiment, a plurality of translucent parts is arranged side by side in the X axis direction, in such a grating pattern that their longitudinal directions are aligned in the Y axis of FIG. 6. In other words, in the first to fourth pattern areas 21 to 24, translucent parts 21A to 24A and non-translucent parts 21B to 24B are alternately repeated in the X axis direction with the pitch "g", respectively. Also, the numbers of translucent parts and non-translucent parts of the first to fourth pattern areas 21 to 24 may be the same or may be different. Also, the numbers of translucent parts and non-translucent parts of some of the pattern areas may be the same and the numbers of translucent parts and non-translucent parts of the other pattern areas may be different.

In this example, an offset between the first pattern area 21 and the second pattern area 22, an offset between the second pattern area 22 and the third pattern area 23, and an offset between the third pattern area 23 and the fourth pattern area 24 are represented by ΔX1, ΔX2, and ΔX3, respectively. The offsets ΔX1 to ΔX3 may be an offset of [1/(2×s)] of the pitch "g" as well as the first embodiment.

For ease of explanation, in FIG. 6, the light intensity distribution of the interference fringes of the positive first-order diffracted beams and the negative first-order diffracted beams is shown. Since the first to fourth pattern areas 21 to 24 are disposed with the offsets as described above, in the light intensities P of the interference fringes on the light receiving surface of the detecting unit 6, on the same principle as that described in the first embodiment, dark parts DS1 to D3 occur at positions corresponding to the joint lines of the pattern areas. Also, since positions where the dark parts DS1 to D3 appear can be determined based on design of the scale 7 and the distance from the scale 7 to the detecting unit 6. The signal processing unit 3 can detect the dark parts DS1 to D3 moving with movement of the scale 7 in the X axis direction, and detect a detected value as a reference position.

In the present embodiment, more light receiving devices may be provided in the detecting unit such that it is possible to perform more accurate reference position detection, for example, by averaging reference position detection results of the individual light receiving devices. Also, the detecting unit can be configured by disposing patterns having translucent parts (slits) at intervals of distances based on the positions where the dark parts DS21 to D23 appear, on a light receiving device having a large area. In this case, it is possible to increase the amount of light reception of the light receiving device at non-reference positions. Also, since the light intensity of each translucent part decreases at a reference position, between the reference position and the non-reference positions, a difference in the light intensity which the light receiving device detects increases. Therefore, detection of the reference position becomes easier.

Also, in the present embodiment, the example in which the pattern 20 has four pattern areas (the number of the joint lines of the pattern areas is three) has been described. However, the number of pattern areas may be three (the number of the joint lines of pattern areas may be two), or may be five or more (the number of the joint lines of pattern areas may be four or more).

Also, the positions of the joint lines of pattern areas may be disposed in a random manner, and may be disposed based on a pseudo-random code such as an M-sequence code. If an M-sequence code is used, it is possible to further increase the difference in the light intensity which the light receiving device detects, between the reference position and the non-reference positions. It is obvious that, if a longer M-sequence code is used, it is possible to improve the difference in the light intensity which the light receiving device detects, between the reference position and the non-reference positions.

Therefore, according to this configuration, it is possible to implement an encoder capable of more easily detecting a reference position with higher accuracy.

Third Embodiment

Figure 7:
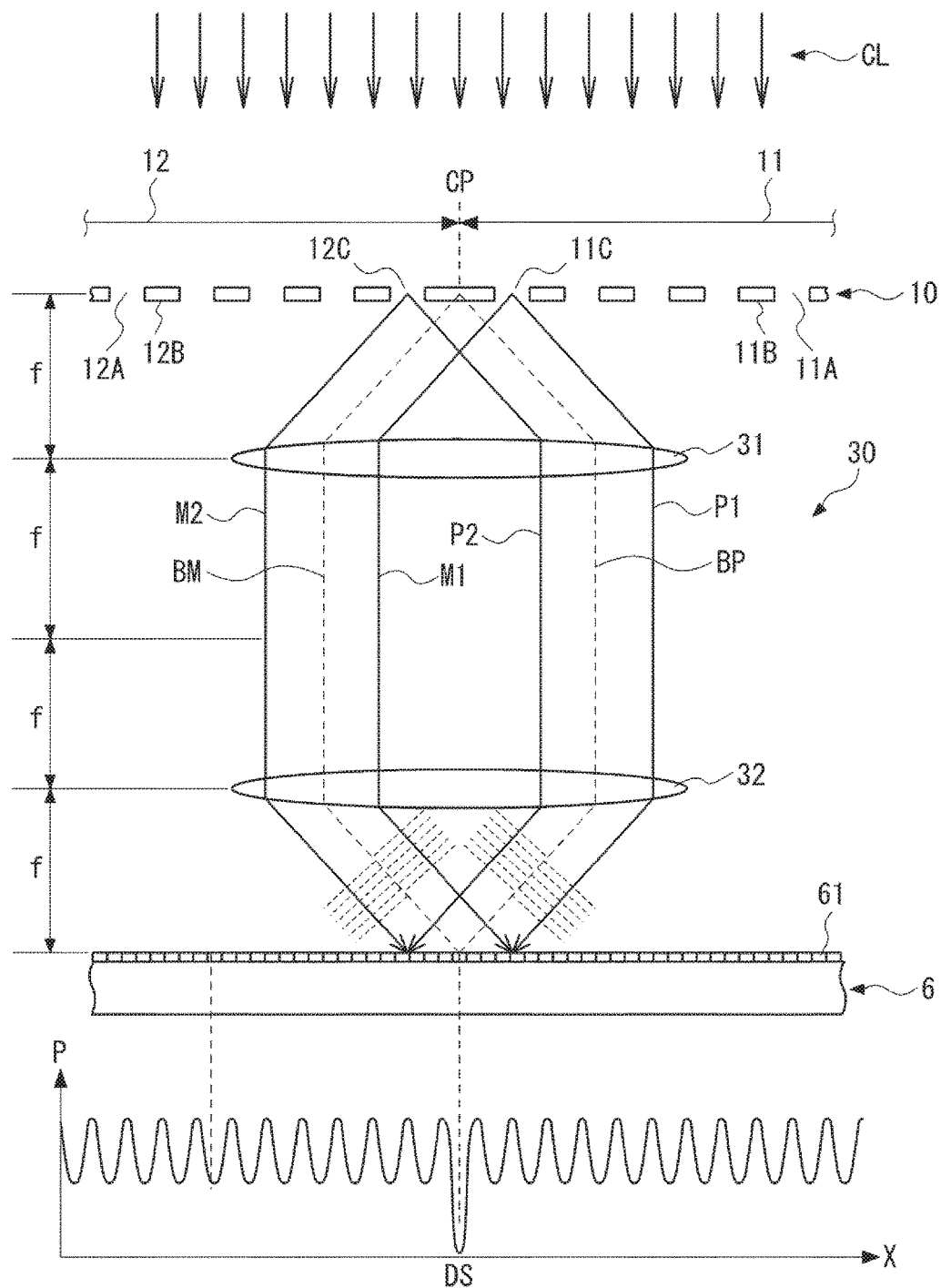
FIG. 7 is a perspective view schematically illustrating the configuration of an optical encoder 300 according to a third embodiment.

An optical encoder according to a third embodiment of the present invention will be described. FIG. 7 is a view schematically illustrating the configuration of an optical encoder according to the third embodiment. As shown in FIG. 7, the optical encoder has a configuration obtained by replacing the optical system 5 of the optical encoder 100 according to the first embodiment with an optical system 30.

Similarly to the optical system 5, the optical system 30 is configured as an imaging optical system for imaging the positive first-order diffracted beams (P1 and P2) and the negative first-order diffracted beams (M1 and M2) having passed through the scale 1 on the light receiving surface of the detecting unit 6. In the present embodiment, the optical system 30 has a lens 31 and a lens 32, and is configured as a bi-telecentric imaging optical system. In the present embodiment, the lenses 31 and 32 have a focal length "1".

The lens 31 and the lens 32 are disposed side by side in the light axis (that is, the Z axis) direction of the parallel beams CL. At this time, the lens 31 is disposed at a position spaced away from the scale 1 toward the detecting unit 6 (one side of the Z axis) by the focal length "f". The lens 32 is disposed at a position spaced away from the lens 31 toward the detecting unit 6 (one side of the Z axis) by twice the focal length "f" (2f) and spaced away from the detecting unit 6 toward the lens 31 (one side of the Z axis) by the focal length "f".

Since the optical system 30 is a bi-telecentric imaging optical system, the positive first-order diffracted beam P1, the positive first-order diffracted beam P2, the negative first-order diffracted beam M1, and the negative first-order diffracted beam M2 caused by the pattern 10 are diffracted by the lens 31, whereby their light axes become parallel to the Z axis. Thereafter, the positive first-order diffracted beam P1, the positive first-order diffracted beam P2, the negative first-order diffracted beam M1, and the negative first-order diffracted beam M2 are diffracted by the lens 32, and are imaged on the light receiving surface of the detecting unit 6.

Therefore, similarly to the optical system 5, the optical system 30 can image the positive first-order diffracted beams (P1 and P2) and the negative first-order diffracted beams (M1 and M2) on the light receiving surface of the detecting unit 6. Therefore, according to the optical encoder, similarly in the optical encoder 100, it is possible to make the positive first-order diffracted beams (P1 and P2) and the negative first-order diffracted beams (M1 and M2) interfere with each other, thereby detecting the reference position and performing incremental position detection.

Also, in the present embodiment, the case where the optical system 30 is composed of two lenses has been described. However, this is merely illustrative. As long as it is possible to configure a bi-telecentric imaging optical system, an optical system may be configured using three or more lenses. Also, as long as it is possible to image the positive first-order diffracted beams (P1 and P2) and the negative first-order diffracted beams (M1 and M2) having passed through the scale 1 on the light receiving surface of the detecting unit 6, besides bi-telecentric imaging optical systems which are configured using lenses, other optical systems may be used.

Fourth Embodiment

Figure 8:
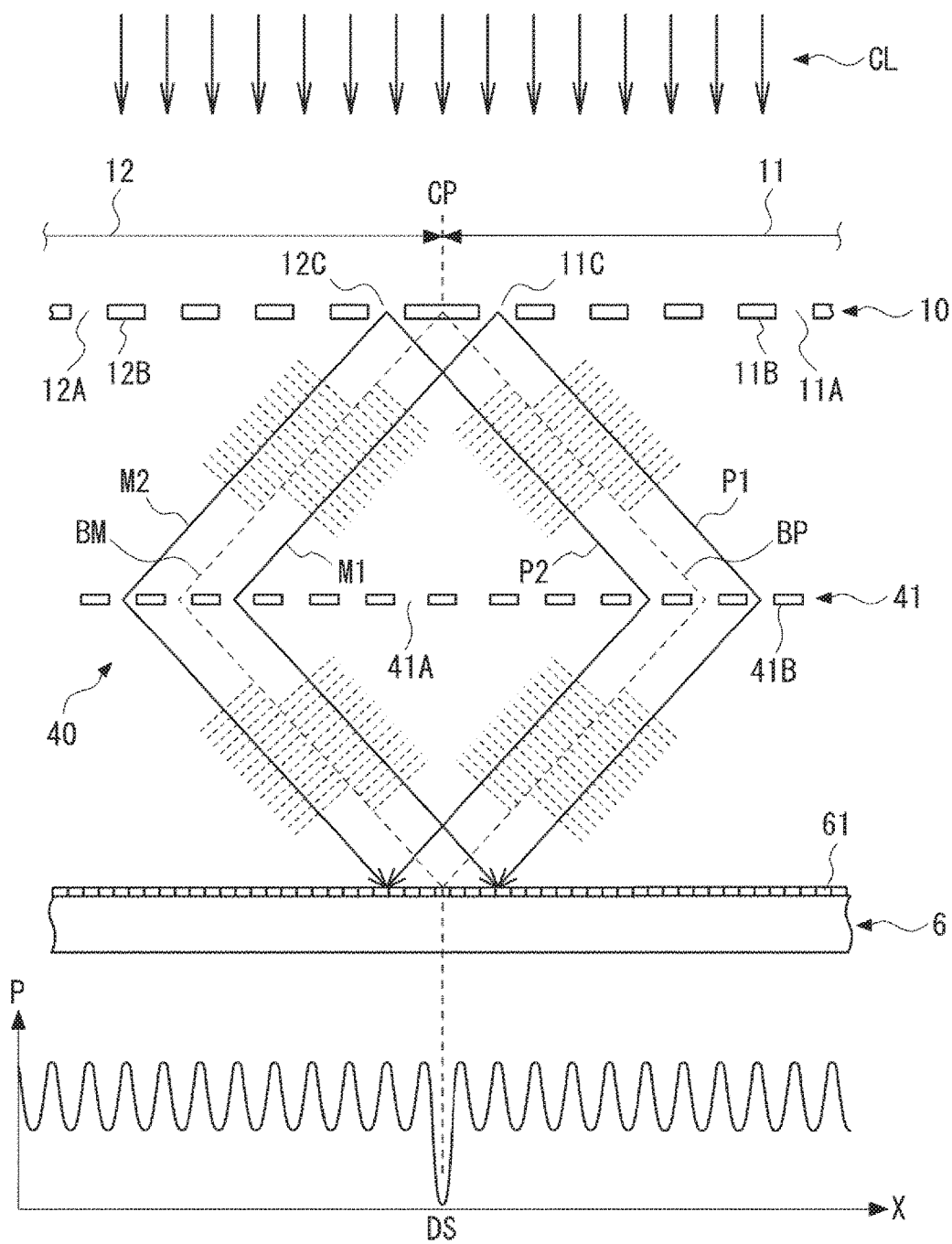
FIG. 8 is a perspective view schematically illustrating the configuration of an optical encoder 400 according to a fourth embodiment.

An optical encoder according to a fourth embodiment of the present invention will be described. FIG. 8 is a view schematically illustrating the configuration of an optical encoder according to the fourth embodiment. As shown in FIG. 8, the optical encoder has a configuration obtained by replacing the optical system 5 of the optical encoder 100 according to the first embodiment with an optical system 40.

Similarly to the optical system 5, the optical system 40 is configured as an imaging optical system for imaging the positive first-order diffracted beams (P1 and P2) and the negative first-order diffracted beams (M1 and M2) having passed through the scale 1 on the light receiving surface of the detecting unit 6. In the present embodiment, the optical system 40 is configured by a diffraction grating 41.

The diffraction grating 41 is a plate-like member which has a plane (the X-Y plane) perpendicular to the Z axis of FIG. 8, as its principal plane, and whose longitudinal direction is aligned in the X axis direction. The diffraction grating 41 is disposed at a position where the positive first-order diffracted beams (P1 and P2) and the negative first-order diffracted beams (M1 and M2) having passed through the scale 1 enter the principal plane (the X-Y plane).

In the plate-like member constituting the diffraction grating 41, translucent parts 41A and non-translucent parts 41B are alternately repeated in the X axis direction with a constant pitch, in such a grating pattern that their longitudinal directions are aligned in the Y axis of FIG. 8. Here, the pitch of the diffraction grating 41 is designed such that the positive first-order diffracted beams (P1 and P2) and the negative first-order diffracted beams (M1 and M2) which are diffracted by the diffraction grating 41 and reach the detecting unit 6 can form interference fringes on the light receiving surface of the detecting unit 6.

It is preferable that the diffraction grating 41 be made of glass. In this case, for example, the non-translucent parts are formed by evaporating a metal layer on the glass. In this case, areas where there is no metal layer become the translucent parts. However, it is possible to use any other material to make the diffraction grating 41 as long as it is possible to make the translucent parts capable of transmitting light and the non-translucent parts incapable of transmitting light in a grating pattern.

In the present embodiment, if the diffraction grating 41 is designed as described above, the positive first-order diffracted beams (P1 and P2) and the negative first-order diffracted beams (M1 and M2) caused by the pattern 10 are diffracted by the diffraction grating 41, thereby being imaged on the light receiving surface of the detecting unit 6. Therefore, similar to the optical system 5, the optical system 40 can image the positive first-order diffracted beams (P1 and P2) and the negative first-order diffracted beams (M1 and M2) on the light receiving surface of the detecting unit 6. Therefore, according to the optical encoder 400, similarly in the optical encoder 100, it is possible to make the positive first-order diffracted beams (P1 and P2) and the negative first-order diffracted beams (M1 and M2) interfere with each other, thereby detecting the reference position and performing incremental position detection.

OTHER EMBODIMENTS

Also, the present invention is not limited to the above-described embodiments, but can be appropriately modified without departing from the scope of the present invention. For example, he above-described encoders according to the embodiments have been described as transmissive optical encoders, but can be applied even to reflective optical encoders. In this case, it is required to replace the translucent parts and non-translucent parts of the grating pattern of the scale with reflective parts and non-reflective parts, respectively. Also, it is required to dispose a light receiving unit on the light source (4) side from the scale.

Also, it goes without saying that the above-described encoders according to the embodiments are not limited to linear encoders and can be configured as rotary encoders.

For ease of explanation, the first to fourth embodiments have been described with a focus on the positive first-order diffracted beams and the negative first-order diffracted beams. However, similarly in the first embodiment, it goes without saying that it is possible to form interference fringes using diffracted beams of two or more orders, thereby detecting the scale position.

What is claimed is:

1. An encoder comprising:
    a scale having a plurality of pattern areas having a plurality of patterns arranged in a measurement direction with an equal predetermined pitch and including at least one pattern area disposed with an offset, in the measurement direction, from a neighboring pattern area by $1/(2 \times s)$ of the predetermined pitch (wherein "s" is an integer of 1 or greater), the plurality of patterns comprising at least first and second patterns, each of which comprises a plurality of spaced pattern elements, that are linearly arranged in the measurement direction;
    a detection head configured to be relatively movable in the measurement direction with respect to the scale, and detect interference fringes caused by positive s-th-order diffracted beams and negative s-th-order diffracted beams diffracted by the scale, and output a detection result; and
    a signal processor configured to detect a reference position based on a position where light intensity is lower than a predetermined value which appears in a light intensity distribution of the interference fringes, and detect incremental positions based on the interference fringes which appear at positions other than the position where light intensity is lower than the predetermined value,
    wherein, the detection head includes:
        a light source configured to radiate beams onto the scale;
        a detecting unit, arranged in parallel with the scale, having a plurality of light receiving devices aligned along the measurement direction to obtain the light intensity distribution, and configured to output the detection result of the beams radiated onto the plurality of light receiving devices, to the signal processor; and
        an optical system disposed between the scale and the detecting unit, and configured to image positive s-th-order diffracted beams and negative s-th-order diffracted beams generated when the beams are radiated onto the scale, on the detecting unit.

2. The encoder according to claim 1, wherein:
    the optical system includes:
        a first mirror disposed such that its mirror surface is perpendicular to the measurement direction, and configured to reflect the positive s-th-order diffracted beams toward the detecting unit; and
        a second mirror disposed such that its mirror surface is perpendicular to the measurement direction and faces the first mirror, and configured to reflect the negative s-th-order diffracted beams toward the detecting unit, and
    the first mirror and the second mirror are disposed at positions for imaging the positive s-th-order diffracted beams and the negative s-th-order diffracted beams on the detecting unit.

3. The encoder according to claim 1, wherein:
    the optical system is configured as a bi-telecentric imaging optical system including two or more lenses.

4. The encoder according to claim 1, wherein:
    the optical system includes a diffraction grating for imaging the positive s-th-order diffracted beams and the negative s-th-order diffracted beams on the detecting unit.

5. The encoder according to claim 1, wherein:
the plurality of pattern areas is disposed such that a plurality of joint lines occurs due to an offset of one or both of two neighboring pattern areas.

6. The encoder according to claim 5, wherein:
the joint lines are disposed in a random manner or a pseudo-random manner.

7. The encoder according to claim 6, wherein:
the joint lines are disposed based on an M-sequence code.

8. The encoder according to claim 1, wherein each of the first and second patterns include a plurality of pattern elements that are sequentially positioned in the measurement direction with the offset being provided between the first and second patterns.

9. The encoder according to claim 1, wherein the offset is equal to [g/(2 ×s)] where g is the predetermined pitch.

10. The encoder according to claim 1, wherein, in the light intensity distribution, the interference fringes have a pitch of [g/(2 ×s)].

11. The encoder according to claim 1, wherein interference fringes caused by the first pattern area are offset from interference fringes caused by the second pattern area.

12. The encoder according to claim 11, wherein the offset between the interference fringes caused by the first pattern area and the interference fringes caused by the second pattern area is the same as the pitch of the interference fringes.

13. The encoder according to claim 11, wherein the interference fringes caused by the first pattern area and the interference fringes caused by the second pattern area have a same phase.

* * * * *